United States Patent
Zhang et al.

(10) Patent No.: US 7,725,201 B2
(45) Date of Patent: May 25, 2010

(54) FEEDBACK CONTROL DEVICE

(75) Inventors: Wennong Zhang, Fukuoka (JP);
Yasuhiko Kaku, Fukuoka (JP)

(73) Assignee: Kabushiki Kaisha Yaskawa Denki, Tokyo (JP)

( * ) Notice: Subject to any disclaimer, the term of this patent is extended or adjusted under 35 U.S.C. 154(b) by 1002 days.

(21) Appl. No.: 10/450,301

(22) PCT Filed: Dec. 13, 2001

(86) PCT No.: PCT/JP01/10951

§ 371 (c)(1),
(2), (4) Date: Jun. 13, 2003

(87) PCT Pub. No.: WO02/48806

PCT Pub. Date: Jun. 20, 2002

(65) Prior Publication Data

US 2004/0054440 A1 Mar. 18, 2004

(30) Foreign Application Priority Data

Dec. 14, 2000 (JP) ............................. 2000-379600
Feb. 2, 2001 (JP) ............................. 2001-026766

(51) Int. Cl.
*G05B 11/01* (2006.01)
*G05B 13/02* (2006.01)
*G05B 6/02* (2006.01)

(52) U.S. Cl. ............................. 700/72; 700/45; 700/54; 318/621

(58) Field of Classification Search ............. 700/40–45, 700/54, 55, 71, 72; 318/609–611, 615–618, 318/621; 123/339.2, 399
See application file for complete search history.

(56) References Cited

U.S. PATENT DOCUMENTS

| | | | | |
|---|---|---|---|---|
| 4,195,337 A | * | 3/1980 | Bertrand et al. | 700/31 |
| 5,371,449 A | * | 12/1994 | Tajima et al. | 318/560 |
| 5,479,897 A | * | 1/1996 | Kawai et al. | 123/339.2 |
| 5,544,039 A | * | 8/1996 | Hiroi | 700/31 |
| 5,568,378 A | * | 10/1996 | Wojsznis | 700/44 |
| 5,651,341 A | * | 7/1997 | Harada et al. | 123/339.2 |
| 5,828,014 A | * | 10/1998 | Goto et al. | 187/292 |
| 5,936,858 A | * | 8/1999 | Arai | 700/30 |
| 5,992,383 A | * | 11/1999 | Scholten et al. | 123/399 |
| 6,185,467 B1 | * | 2/2001 | Romano et al. | 700/28 |

(Continued)

FOREIGN PATENT DOCUMENTS

JP 63-67605 A 3/1988

(Continued)

*Primary Examiner*—Crystal J Barnes-Bullock
(74) *Attorney, Agent, or Firm*—Sughrue Mion, PLLC

(57) ABSTRACT

In a feedback control apparatus comprising a controller, a control object to be controlled by the controller, and an observer for inputting a control output from the control object and an output of the controller and setting an output of a control object model to be a feedback signal, the observer includes an observer compensator for inputting a difference between the control output and an output of an element model and inputs, to the control object model, a sum of an output of the observer compensator and the output of the controller. Consequently, a control system having an excellent response performance can be constituted and a stable observer can easily be constituted.

2 Claims, 4 Drawing Sheets

U.S. PATENT DOCUMENTS

| | | | |
|---|---|---|---|
| 6,289,971 B1 * | 9/2001 | Kagawa | 164/449.1 |
| 6,453,229 B1 * | 9/2002 | Ohkuma et al. | 701/109 |
| 6,584,367 B1 * | 6/2003 | Makino et al. | 700/60 |
| 2002/0111758 A1 * | 8/2002 | Wang et al. | 702/79 |

FOREIGN PATENT DOCUMENTS

| | | | | |
|---|---|---|---|---|
| JP | 03093486 A | * | 4/1991 | |
| JP | 03110605 A | * | 5/1991 | |
| JP | 05313754 A | * | 11/1993 | |
| JP | 7-121205 A | | 5/1995 | |
| JP | 09311701 A | * | 12/1997 | |
| JP | 64-48104 A | | 2/1998 | |
| JP | 11-85204 A | | 3/1999 | |
| JP | 11-344983 A | | 12/1999 | |

* cited by examiner

PRIOR ART

PRIOR ART

PRIOR ART

FEEDBACK CONTROL DEVICE

TECHNICAL FIELD

The present invention relates to a feedback control method and apparatus in which a delay element is present in a controller or a control object or a dead time is present in the input and output of the control object.

BACKGROUND ART

A dead time or a delay element of a filter is present in a controller or a control object in most control systems such as a servo and a process control. FIG. 3 is a block diagram showing an ordinary feedback control system.

In FIG. 3, 2 denotes a main controller (for example, a PID controller), 3 denotes a delay element of the controller, 4 denotes a delay element of a control object and 5 denotes an element having no delay of the control object. In such a control system, the phase of the delay element is delayed. Therefore, the gain of the controller cannot be increased and a sufficient response characteristic cannot be obtained. For this reason, a compensation control for a phase delay is required.

In order to compensate for the phase delay, conventionally, a phase leading compensation element 12 is often added in series as shown in FIG. 4. If $T_a$ and $T_b$ are properly set to be $T_a > T_b$, the phase of the phase leading compensation element 12 is led and the gain of the main controller 2 is increased so that a control performance can be enhanced.

In the conventional phase compensation control method, however, there has been a problem in that a gain in the high-frequency region of the phase leading compensation element is increased and a high-frequency oscillation is apt to be caused.

Moreover, a dead time is present in the inputs or outputs of most control systems such as a servo and a process control. FIG. 8 is a block diagram showing a conventional feedback control system. In FIG. 8, 22 denotes an ordinary controller (for example, a PID controller) and 23 denotes a control object including a dead time. In such a control system, the phase of a dead time element is delayed. Therefore, the gain of the controller cannot be increased and a sufficient response characteristic cannot be obtained. Therefore, it is necessary to carry out a compensation control for a dead time.

Conventionally, a Smith compensator shown in FIG. 9 has often been used to compensate for a dead time. In FIG. 9, 25 denotes a prediction model of a control object and 26 denotes a dead time element. Taking note of a control input and a feedback signal, a control system in FIG. 9 can be equivalently rewritten as shown in FIG. 6. Referring to FIG. 6, the stability of a feedback system is the same as that of a system having no dead time and the gain of a controller C(s) can be increased so that a control output y can follow a target input r with high precision.

The disturbance removing characteristic of the conventional Smith method will be taken into consideration. Assuming that a disturbance d is present on a control input end as shown in FIG. 10, a transfer function from the disturbance d to the control output y is given as follows.

$$\frac{y(s)}{d(s)} = \frac{P(s)e^{-Ls}}{1+C(s)P(s)} + \frac{C(s)P(s)e^{-Ls}}{1+C(s)P(s)}[P(s)-P(s)e^{-Ls}] \quad (1)$$

When the steady value of the control output y for a step disturbance $d(s)=1/s$ is represented by $y_{sd}$, the following equation can be obtained.

$$y_{sd} = \lim_{t\to\infty} y(t) = \quad (2)$$

$$\lim_{s\to 0} sy(s) = \lim_{s\to 0}\left\{\frac{P(s)e^{-Ls}}{1+C(s)P(s)} + \frac{C(s)P(s)e^{-Ls}}{1+C(s)P(s)}[P(s)-P(s)e^{-Ls}]\right\}$$

If C(s) has an integrator, the following equation can be set up.

$$y_{sd} = \lim_{s\to 0}[P(s)-P(s)e^{-Ls}] = L\lim_{s\to 0} sP(s) \quad (3)$$

If P(s) has a pole of s=0, $y_{sd} \ne 0$ is obtained. More specifically, in the Smith method, there is a problem in that a steady-state deviation is made for a control object having the pole of s=0. Moreover, if P(s) is unstable in the equation (1), there is a problem in that an output diverges even if any small disturbance is made.

SUMMARY OF THE INVENTION

It is an object of the invention to provide a control apparatus which can increase a control gain and has an excellent responsiveness.

It is another object of the invention to provide a feedback control apparatus capable of compensating for the phase delay of a delay element so as not to make a high-frequency oscillation and causing a control output to follow a target input with high precision in a control system in which a delay element is present in a controller or a control object.

It is a further object of the invention to provide a dead time compensation feedback control apparatus capable of constituting a stable control system for an unstable control object without making a steady-state deviation for a control object having a pole of s=0.

DISCLOSURE OF THE INVENTION

In order to attain the object, the invention provides a feedback control apparatus comprising a controller, a control object to be controlled by the controller, and an observer for inputting a control output from the control object and an output of the controller and setting an output of a control object model to be a feedback signal, wherein the observer includes an observer compensator for inputting a difference between the control output and an output of an element model and inputs, to the control object model, a sum of an output of the observer compensator and the output of the controller, and a control apparatus for carrying out a feedback control to cause a control output to follow a target input for a control system in which a delay element is present in a controller or a control object, wherein an observer is constituted in such a manner that a difference between the control output and an output of the observer is input to an observer compensator, an output of the observer compensator and an output of a main controller are added and input to an element model having no delay of the control object, and a signal obtained by sending an output of the element model having no delay of the control object through a delay element model of the controller and a delay element model of the control object is set to be the output of the observer, and the output of the element model having no delay of the control object is subtracted from the target input and is input to the main controller, and a signal obtained by sending an output of the main controller through a delay element of the controller is set to be a control input, thereby controlling the control object. Moreover, the invention provides a feedback control apparatus for causing a control output to follow a target input for a control object in which a dead time is present in an input or an output, wherein an observer is constituted in such a manner that a difference between the control output and an output of a dead time element of the control object is input to an observer compensator, an output of the observer compensator and a control input are added and input to a prediction model of the control object, and an output of the prediction model of the control object is input to the dead time element of the control object, and furthermore, is set to be a prediction value of the control output, and the prediction value of the control output is subtracted from the target input and a value thus obtained is input to a controller and an output of the controller is set to be the control input.

BEST MODE OF CARRYING OUT THE INVENTION

Figure 1:
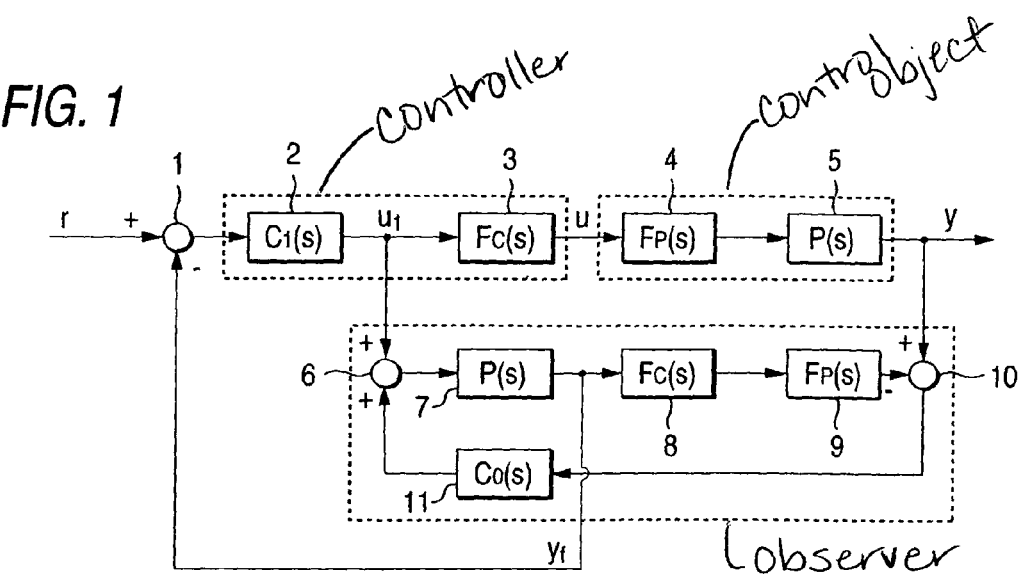
FIG. 1 is a block diagram showing the structural principle of a first control system according to the invention.

An embodiment of the invention will be described with reference to the drawings. FIG. 1 is a block diagram showing the structural principle of a control system according to the invention. In FIG. 1, 2 denotes a main controller, 3 denotes a delay element of the controller, 4 denotes a delay element of a control object, 5 denotes an element having no delay of the control object, 7 denotes an element model having no delay of the control object, 8 denotes a delay element model of the controller, 9 denotes a delay element model of the control object, and 11 denotes an observer compensator.

In general, it is necessary to provide a filter in order to remove a noise when constituting the controller. In the control object, moreover, a dead time element or a primary delay element is present in a control input or a control output. If these delay elements are not separated, it is hard to constitute the main controller in order to simultaneously satisfy a stability and a control performance. Therefore, the controller is divided into the main controller 2 and the delay element 3 of the controller and an observer including the delay element of the controller is constituted based on an output $u_1$ of the main controller and a control output y, and an output having no delay of the observer is set to be a feedback signal $y_f$.

More specifically, the output $u_1$ of the main controller 2 and the output of the observer compensator 11 are added in 6 and input to the element model 7 having no delay of the control object. The output of the element model 7 having no delay of the control object is set to be the feedback signal $y_f$ of the control system and a signal obtained by subtracting the feedback signal $y_f$ from a target input r through a subtracter 1 is input to the main controller 2 and the output $u_1$ of the main controller 2 is input to the control object through the delay element 3 of the controller, thereby controlling the control object, while it is input to a subtracter 10 through the delay element model 8 of the controller and the delay element model 9 of the control object and a signal obtained by a subtraction is input from the control output y to the observer compensator 11.

Referring to FIG. 1, in the open loop of the control system, a transfer function from the output $u_1$ of the main controller 2 to the feedback signal $y_f$ is obtained as follows.

$$y_f(s)/u_1(s)=P(s) \quad (4)$$

Figure 2:
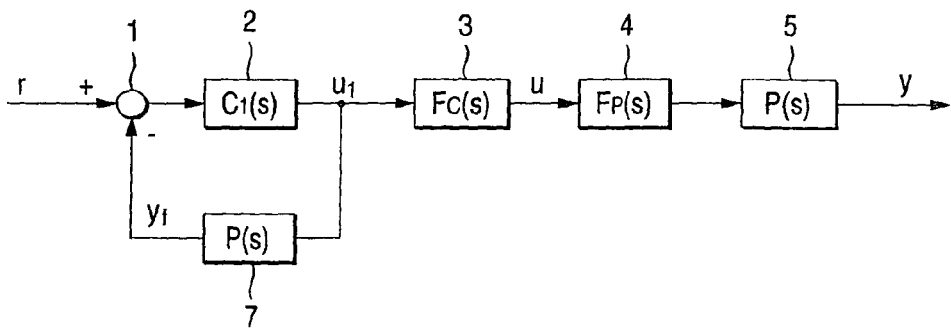
FIG. 2 is an equivalent block diagram of FIG. 1.
Figure 3:
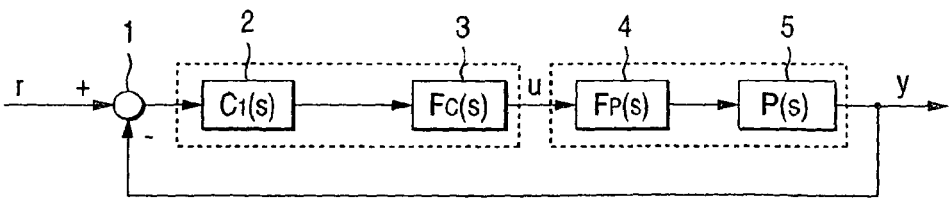
FIG. 3 is a block diagram showing an ordinary feedback control system.
Figure 4:
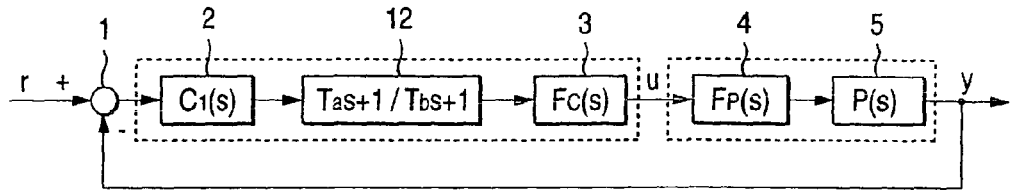
FIG. 4 is a block diagram showing a conventional phase leading compensation control system.

Therefore, the control system in FIG. 1 can be rewritten equivalently as shown in FIG. 2. Referring to FIG. 2, the stability of a feedback control system is the same as that of a system having no delay so that the gain of the main controller 2 can be increased. Moreover, a transfer function from the target input r to the control output y is obtained as follows.

$$y(s)/r(s)=C_1(s)P(s)/1+C_1(s)P(s)F_c(s)F_p(s) \quad (5)$$

Therefore, it is possible to cause the output y to follow the target input r with high precision by increasing the gain of the main controller 2.

Although an observer loop has a delay element, an input/output characteristic is not related to the observer compensator 11 based on the equation (5). For this reason, the gain of the observer compensator 11 may be set to be low. Accordingly, a stable observer can easily be constituted.

Figure 5:
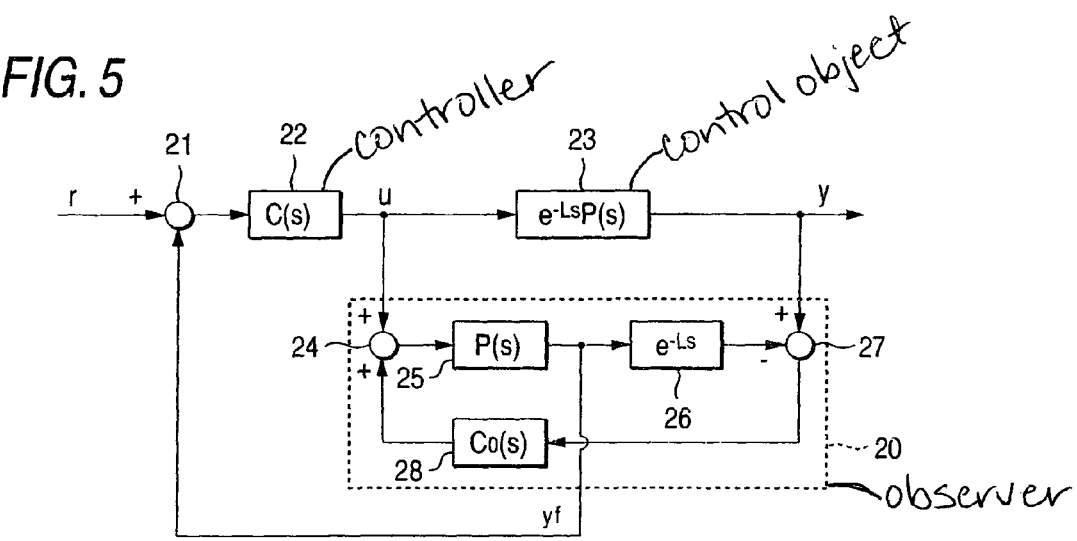
FIG. 5 is a block diagram showing the structural principle of a second control system according to the invention.

Another embodiment of the invention will be described with reference to the drawings. FIG. 5 is a block diagram showing the structural principle of a second control system according to the invention. In FIG. 5, 22 denotes a controller, 23 denotes a control object including a dead time, 25 denotes a prediction model of the control object, 26 denotes a dead time element, and 28 denotes a compensator of an observer 20.

Referring to FIG. 5, a transfer function from a control input u to the feedback signal $y_f$ is obtained as follows.

$$y_f(s)/u(s)=P(s) \quad (6)$$

Figure 6:
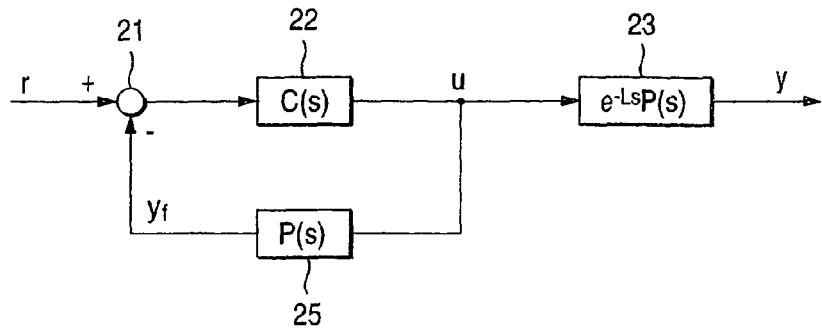
FIG. 6 is an equivalent block diagram of FIGS. 5 and 9.

Therefore, the control system in FIG. 5 can be rewritten equivalently as shown in FIG. 6. Referring to FIG. 5, the stability of a feedback system is the same as that of a system having no dead time so that the gain of a controller C(s) can be increased. Moreover, a transfer function from the target input r to the control output y is obtained as follows.

$$y(s)/r(s)=C(s)P(s)e^{-Ls}/1+C(s)P(s) \quad (7)$$

Therefore, it is possible to cause the output y to follow the target input r with high precision by increasing the gain of the controller C(s).

Figure 7:
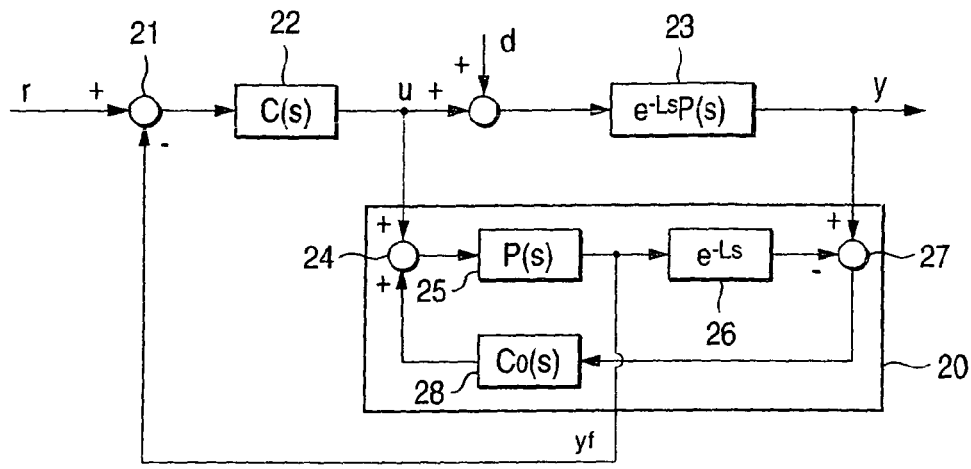
FIG. 7 is a block diagram showing the case in which a disturbance is taken into consideration in FIG. 5.
Figure 8:
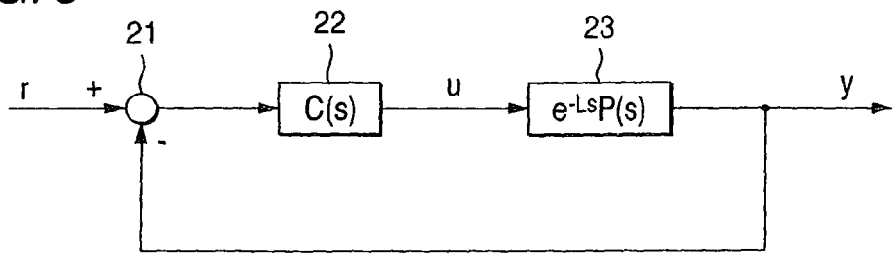
FIG. 8 is a block diagram showing a conventional feedback control system.
Figure 9:
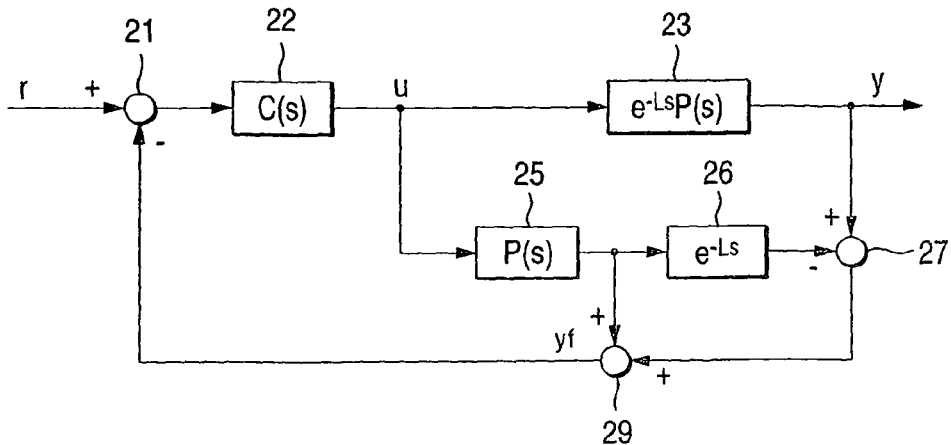
FIG. 9 is a block diagram showing a control system using a Smith compensator.
Figure 10:
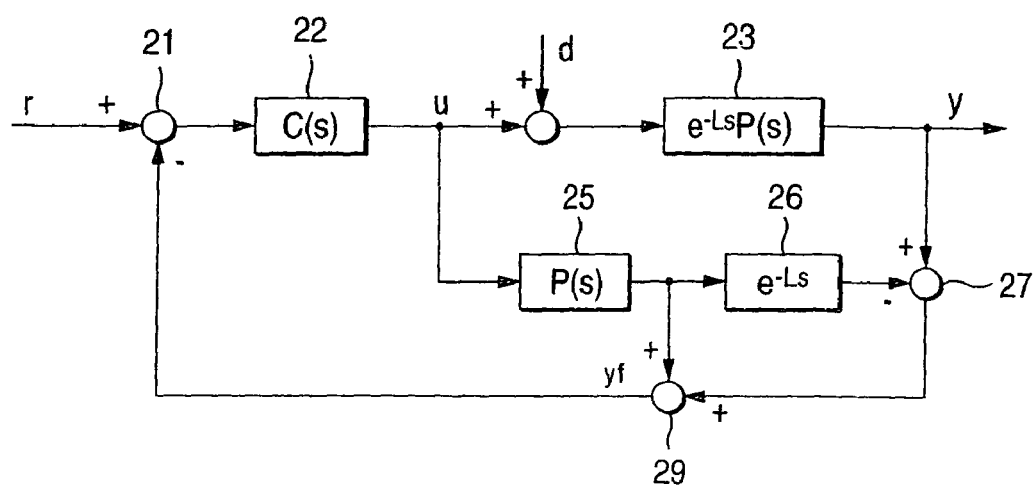
FIG. 10 is a block diagram showing the case in which a disturbance is taken into consideration in FIG. 9.

In order to consider a disturbance removing characteristic, a disturbance d is given to a control input end as shown in FIG. 7. Referring to FIG. 7, a transfer function from the disturbance d to the control output y is obtained as follows.

$$\frac{y(s)}{d(s)} = \frac{P(s)e^{-Ls}}{1+C(s)P(s)} + \frac{C(s)P(s)}{1+C(s)P(s)} \cdot \frac{P(s)e^{-Ls}}{1+C_o(s)P(s)e^{-Ls}} \qquad (8)$$

When the steady value of an output for a step disturbance $d(s)=1/s$ is represented by $y_{sd}$, the following equation is obtained.

$$y_{sd} = \lim_{t \to \infty} y(t) = \qquad (9)$$

$$\lim_{s \to 0} sy(s) = \lim_{s \to 0} \left\{ \frac{P(s)e^{-Ls}}{1+C(s)P(s)} + \frac{C(s)P(s)}{1+C(s)P(s)} \cdot \frac{P(s)e^{-Ls}}{1+C_o(s)P(s)e^{-Ls}} \right\}$$

Both the controller $C(s)$ and an observer compensator $C_o(s)$ have integrators, the following equation is obtained.

$$y_{sd}=0 \qquad (10)$$

More specifically, a steady-state deviation is not made for a control object having a pole of s=0. Referring to the equation (6), moreover, even if P(s) is unstable, an output does not diverge when C(s) stabilizes P(s) and $C_o(s)$ stabilizes $P(s)e^{-Ls}$. Referring to the equation (7), the input/output characteristic is not related to $C_o(s)$. Therefore, the gain of $C_o(s)$ can be set to be low in such a manner that the $P(s)e^{-Ls}$ is stabilized.

Items 21, 24, 27 and 29 in FIGS. 5-10 are adders/subtractors provided at the appropriate location in the respective control diagrams.

As described above, in the invention, the observer including the delay element of the controller is constituted and the output having no delay of the observer is set to be the feedback signal so that the control system is divided into a feedback control section and an observer section. The stability of a feedback loop is the same as that of a system having no delay and a control gain is increased. Consequently, the response performance of the control system can be enhanced. On the other hand, an observer loop has a delay element and an observer compensator does not influence an input/output characteristic. Consequently, the gain of the observer compensator may be set to be low. Thus, a stable observer can easily be constituted.

In the invention, moreover, the observer of the dead time system is constituted and the prediction value of the control output is set to be the feedback signal. Consequently, the control system is divided into the feedback control section and the observer section and the stability of the feedback loop is the same as that of a system having no dead time and a control gain is increased. Consequently, the response performance of the control system can be increased. In addition, since the observer is constituted, it is possible to obtain a high resistance to a disturbance as well as a stable object.

Industrial Applicability

According to the invention, a control system having an excellent response performance can be constituted and a stable observer can easily be constituted.

The invention claimed is:

1. A feedback control apparatus for carrying out a feedback control to cause a control output to follow a target input for a control system having a delay element in a control object or in a controller, said feedback control apparatus comprising:
   a controller which includes at least a main controller and a delay element of the controller;
   a control object which receives an output from the delay element of the controller, and
   an observer which receives the control output so as to follow the target input for the controller, said observer comprising:
   a first element model having no-delay element of the control object;
   a second element model, having a delay element model of the controller, which receives an output of the first element model;
   a third element model, having a delay element model of the control object, which receives an output of the second element model;
   a subtracter which receives an output of the third element model and the control output of the control object so as to output the subtracted signal thereof, and
   an observer compensator which receives said subtracted signal from the subtracter, wherein
   an output signal of the main controller and the feedback signal of the observer compensator are added and input to the first element model, and
   wherein an error signal is produced in the observer through the observer compensator, and fed back to the control object through the controller.

2. A feedback control apparatus for causing a control output to follow a target input for a control object including a dead time thereof, said feedback control apparatus including:
   a compensator which receives difference between the control output and an output of a dead time element of the control object, so that an output of the compensator and a control input are added and input to a prediction model of the control object having no-delay element of the control object, wherein
   an output of the prediction model of the control object is input to the dead time element so as to constitute a observer, while said output of the prediction model is input to a subtracter of which value is subtracted from the target input value so that a value thus obtained is input to a controller and an output of the controller is set to be the control input of the control object, and
   wherein an error signal is produced in the observer through an observer compensator, and fed back to the control object through the controller.

* * * * *